(12) United States Patent
Rohatgi et al.

(10) Patent No.: US 12,314,990 B2
(45) Date of Patent: May 27, 2025

(54) AMBIENT LISTENING SYSTEM FOR SALES ASSISTANCE

(71) Applicant: NUANCE COMMUNICATIONS, INC., Burlington, MA (US)

(72) Inventors: Abhishek Rohatgi, Quebec (CA); Eduardo Olvera, Phoenix, AZ (US); Dinesh Samtani, Mississauga (CA); Manpreet Singh, Laval (CA); Manar Alazma, Lexington, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 205 days.

(21) Appl. No.: 17/825,576

(22) Filed: May 26, 2022

(65) Prior Publication Data

US 2023/0385893 A1   Nov. 30, 2023

(51) Int. Cl.
*G06Q 30/06* (2023.01)
*G06F 21/32* (2013.01)
(Continued)

(52) U.S. Cl.
CPC ......... *G06Q 30/0613* (2013.01); *G06F 21/32* (2013.01); *G06Q 30/0625* (2013.01);
(Continued)

(58) Field of Classification Search
CPC ..................... G06Q 30/0613; G06Q 30/0625; G06F 21/32; G10L 17/06; G10L 25/51
(Continued)

(56) References Cited

U.S. PATENT DOCUMENTS 7,606,741 B2   10/2009 King et al.
10,051,131 B2   8/2018 Saylor et al.
(Continued)

FOREIGN PATENT DOCUMENTS

| AU | 2005224747 B2 | * | 11/2010 | ......... G06F 17/2795 |
| GB | 2555203 B | * | 6/2019 | ............ G06F 16/48 |
| WO | WO-2020054189 A1 | * | 3/2020 | ............ H04M 1/663 |

OTHER PUBLICATIONS

Reference: (ii) Article, Sony (6758) issued patent titled "Information Processing Device, Information Processing Method, and Information Processing System"; News Bites—Electronics [Melbourne] Apr. 9, 2021; retrieved from Dialog on Apr. 11, 2024 (Year: 2021).*

(Continued)

Primary Examiner — Yogesh C Garg
(74) Attorney, Agent, or Firm — Barta Jones, PLLC

(57) ABSTRACT

An ambient listening system, includes: an ambient device configure to listen to a conversation between a customer and a sales agent regarding at least one of a desired service and a desired product, and generate an audio stream of the conversation and a unique identifier for the customer; a voice biometrics service module configure to perform at least one of i) identification of the customer based on the audio stream, and ii) voiceprint enrollment of the customer's voice based on the audio stream and the unique identifier for the customer; a business logic module configured to generate at least one business logic output based on at least one of customer's intent and entity extracted from the audio stream; and an automation platform configured to automate, based on the business logic output, the sales agent's workflow related to at least one of customer record, the desired service and the desired product.

18 Claims, 2 Drawing Sheets

(51) Int. Cl.
*G06Q 30/0601* (2023.01)
*G06Q 50/26* (2012.01)
*G10L 17/06* (2013.01)
*G10L 25/51* (2013.01)

(52) U.S. Cl.
CPC ............ *G06Q 50/265* (2013.01); *G10L 17/06* (2013.01); *G10L 25/51* (2013.01)

(58) Field of Classification Search
USPC ...................................................... 705/26.41
See application file for complete search history.

(56) References Cited

U.S. PATENT DOCUMENTS

| | | | | |
|---|---|---|---|---|
| 11,295,315 | B2* | 4/2022 | Veggalam | H04M 3/5191 |
| 2016/0343375 | A1* | 11/2016 | Williams | H04M 3/5166 |
| 2021/0104246 | A1* | 4/2021 | Jolly | G10L 17/02 |
| 2021/0224845 | A1* | 7/2021 | Doumar | H04L 51/56 |
| 2023/0040119 | A1* | 2/2023 | Friio | H04L 51/04 |

OTHER PUBLICATIONS

"Ambient Listening Demo Storified 4", Retrieved From: https://www.youtube.com/watch?v=X7Eps0H-KRI, Nov. 16, 2021, 3 Pages.

* cited by examiner

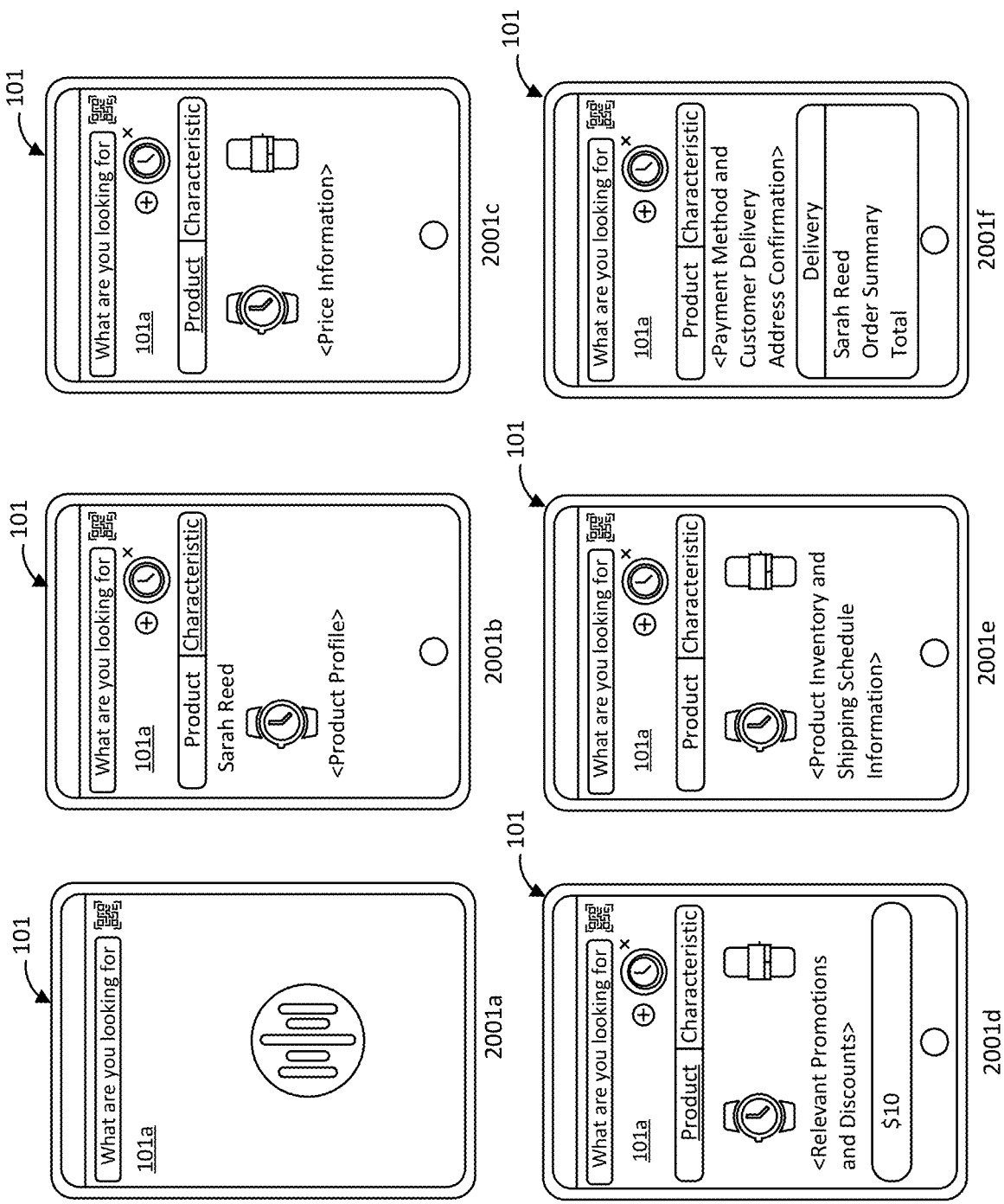

AMBIENT LISTENING SYSTEM FOR SALES ASSISTANCE

BACKGROUND OF THE DISCLOSURE

1. Field of the Disclosure

The present disclosure relates to systems and methods for processing audio, and relates more particularly to systems and methods of processing audio to enhance customer interactions with a customer service agent.

2. Description of the Related Art

One of the critical elements in retail sales is being able to promptly and accurately provide information requested by a customer. Currently, sales representatives have to manually search for information (e.g., on their handheld devices or at a nearby computer workstation) to assist customers in providing relevant information. Unfortunately, this type of manual search for information is not only time-consuming, but often produce inaccurate results. Furthermore, any customer-related information (e.g., name, contact information, payment information, age, past purchase preferences, etc.) needs to be manually inputted and organized in a database, which manual record-keeping requires time and often results in inaccurate records.

Therefore, there is need for a system and a method to enable ambient listening of a conversation to assist both the consumers and employees of retail businesses by providing relevant product information, providing insights, performing analytics and automating various actions associated with a transaction.

SUMMARY OF THE DISCLOSURE

According to an example embodiment of the present disclosure, an ambient listening system and a method are provided which i) enable the ambient listening system to listen in on a conversation that a sales agent is having with customer, and ii) provide real-time recommendations, insights and updates based on contextual and conversational information obtained.

According to an example embodiment of the present disclosure, a system and a method are provided to automate post-encounter processes, e.g.: logging customer-related data, including customer voice, customer payment information and customer shopping preferences; and scheduling delivery.

According to an example embodiment of the present disclosure, a system and a method are provided to identify repeat customers, e.g., by verifying the customers using their voice, and providing suggestions to sales representatives regarding the identified customer's shopping preferences.

According to an example embodiment of the present disclosure, a system and a method are provided to implement a reactive mode ambient listening, in which the ambient listening system listens to the audio and take specified actions based on the information being provided as part of the conversation, e.g., perform automatic speech recognition (ASR), provide a summary of the speech, identify intents contained in the speech, hearing a customer request and filtering information, hearing a new preference from the customer, and saving it to their profile, and distinguish between a customer's voice and a sales agent's voice. The system can provide outputs in multiple modalities: text-to-speech mode for audio-only devices; user interface (UI) outputs or conversation cards for devices with UI screens; or both modes for devices with audio and UI screens.

In another example embodiment of the present disclosure, a system and a method are provided to implement a proactive mode ambient listening, in which the ambient listening system provides real-time insights to the sales agent for helping the customer, which insights can be based on processing various data in real time, e.g., store data, user data, and conversation transcript. The system in the proactive mode can take advantage of customer information, past interactions and contextual data and takes specified actions based on new information that would be valuable for the conversation, e.g., knowing the customer prefers certain materials and filtering them, looking at customer records and determining we can give them a special offer.

In yet another example embodiment of the present disclosure, a system and a method are provided to implement an interactive mode ambient listening, in which the ambient listening system is able to receive specific commands from a user (e.g., the sales agent) and take responsive actions, e.g., provide requested product information, schedule deliveries, update customer records, and proceed with payment transaction.

BRIEF DESCRIPTION OF THE FIGURES

FIG. 2 illustrates an example sequence of events in which the system according to the present disclosure is involved in listening to, and providing relevant information in response to, a conversation between a sales agent and a customer.

DETAILED DESCRIPTION

Figure 1:
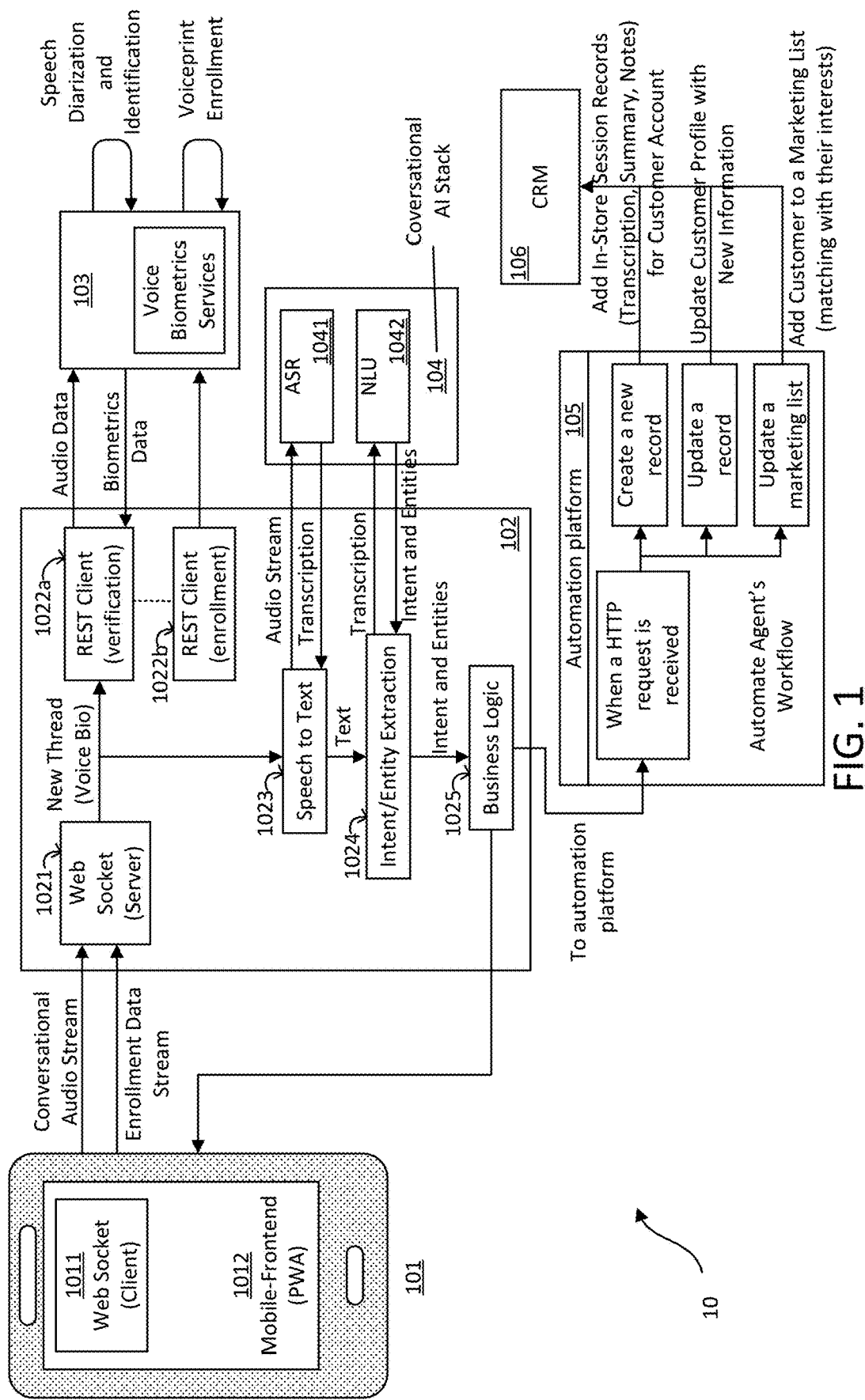
FIG. 1 illustrates the architecture of an example embodiment of a system configured to listen in on a conversation between a sales agent and a customer, and provide appropriate assistance based on contextual and factual information obtained.

According to an example embodiment of the present disclosure, an ambient listening system and a method are provided which: i) enable the ambient listening system to listen in on a conversation that a sales agent is having with customer; ii) provide real-time recommendations, insights and updates based on contextual and conversational information obtained; iii) automate post-encounter processes, e.g., logging customer-related data, including customer voice, customer payment information and customer shopping preferences; and scheduling delivery; and/or iv) identify repeat customers or perform fraud detection, e.g., by verifying the customers using their voice.

FIG. 1 illustrates the architecture of an example embodiment of an ambient listening system 10 configured to: i) listen in on a conversation that a sales agent is having with customer; ii) provide real-time recommendations, insights and updates based on contextual and conversational information obtained; iii) automate post-encounter processes, e.g., logging customer-related data, including customer voice, customer payment information and customer shopping preferences; and scheduling delivery; and/or iv) identify repeat customers, e.g., by verifying the customers using their voice. As shown in FIG. 1, the example embodiment of the system 10 can include: i) ambient device 101 configured to capture a conversation between a customer and a sales agent; ii) virtual machine (VM) 102 hosting various software/application modules; iii) voice biometrics service 103; iv) conversational artificial intelligence (AI) platform (or stack) 104 (e.g., Nuance™ Mix™); v) automation platform (module) 105 (e.g., Microsoft™ Power Automate™); and vi) customer relationship management (CRM) platform 106 (e.g., Microsoft™ Dynamics™). The ambient device 101 (which can be, e.g., a mobile phone, a tablet, or a portable computer), has a web socket 1011 (a computer communications protocol providing full-duplex communication channels over a single TCP connection) and a mobile frontend 1012 (e.g., progressive web app (PWA), a mobile app based on web technology). Mobile frontend 1012 can be any client that a sales agent uses to interact via audio, e.g., in the case of a sales agent at a drive-thru, the sales agent can use just a headset, without a screen interface.

In one example embodiment, the ambient device 101 captures conversational audio from a face-to-face encounter in a store. In another example embodiment, the ambient device 101 can capture conversations between a sales agent using a phone and a customer who calls the sales agent. In a further example embodiment, the ambient device 101 can be utilized in a drive-thru scenario, e.g., the ambient device 101 captures conversations between a sales agent who is using a headset and a customer who is using the drive-thru speaker.

The signal flow for the ambient listening system 10 listening in on a conversation that a sales agent is having with a customer is explained below, along with the various modules handling the signal flow. For the sake of simplicity, it will be assumed here that the sales agent's identifying profile (e.g., user credentials, voice, etc.) is known to, and has been verified by, the ambient listening system 10 (but the signal flow description provided below is equally applicable to the sales agent's audio stream, e.g., for the voice signature enrollment). Upon initiation of a conversation between the customer and the sales agent, the conversational audio stream (including the audio streams of the customer and the sales agent) will be sent from the web socket 1011 of the ambient device 101 to the web socket 1021 of the VM 102. Web socket is just an example of a protocol for client server communication, and any other client server communication protocol or mechanism can be used. VM 102 can be any computing resource (e.g., cloud, local, embedded, hosted, on-premise). Also shown in FIG. 1 is an enrollment data stream sent from the web socket 1011 of the mobile device 101 to the web socket 1021 of the VM 102, which enrollment data stream will contain a unique customer identifier (e.g., customer identification number, email address, phone number, etc.) associated with the customer's audio stream, thereby enabling the ambient listening system 10 to create a voice signature that can be used to verify the customer by voice after a successful enrollment using voice verification. Although mobile device 101 has been described in the example embodiment, any sales device capable of handling agent/customer interaction can be used instead of the mobile device 101.

From the web socket 1021, the streams are forwarded to: i) Representational State Transfer (REST) client 1022a for verification (signal stream labeled as "new thread (voice bio)" in FIG. 1, which signal stream includes both conversational audio and enrollment data); and ii) speech-to-text logic module 1023. First, the signal stream labeled as "new thread (voice bio)" will be explained. The REST client 1022a sends the conversational audio data and a request for biometrics data of the customer to the voice biometrics service 103, a specific example of which is Nuance™ Verification Security Library (NVSL) 8.0. The voice biometrics service 103 can be used for voice identification, authentication, and partitioning of input audio stream according to speaker identity (also referred to as speaker diarization), e.g., partitioning between the customer speech and the sales agent's speech. The voice biometrics service 103 utilizes deep neural networks that analyze, among other factors: i) voice biometrics (how a person sounds, i.e., analyze a person's unique voice signature, including physical and speech delivery factors); and ii) conversational biometrics (how a person uses language, including word choice, grammar, and acronyms).

In the case the customer's biometric data are not already enrolled as part of the voiceprint collection with the voice biometrics service 103, the voice biometrics service 103 will forward the biometrics data for the customer to the REST client 1022a, which biometrics data are in turn transferred to the REST client 1022b. The REST client 1022b sends the voiceprint enrollment data (the unique customer identifier and the associated biometrics data) and a request to the voice biometrics service 103 for enrollment of the voiceprint for the customer. In response, the voice biometrics service 103 enrolls the voiceprint (biometrics data) along with the associated unique customer identifier. Although voice biometrics have been specifically mentioned here, other identification mechanisms, e.g., fingerprint, face recognition, etc., can be used.

In the case the customer's biometric data are already enrolled as part of the voiceprint collection with the voice biometrics service 103, the voice biometrics service 103 will forward the biometrics data for the customer, along with an identification and/or verification of the customer, to the REST client 1022a. The REST client 1022a subsequently verifies the customer using the information provided by the voice biometrics service 103. The customer's profile information (name, date of birth, phone number, email, etc.) associated with the customer's biometric data can be made available to the sales agent, who can ask the customer to provide a particular profile information for further confirmation. In an example embodiment, the unique identifier for the customer can be used to verify the customer at the time of any transaction (e.g., payment) by the sales agent.

To summarize, the functionalities implemented by the ambient listening system 10 based on biometrics can include, e.g., customer enrollment (discussed above), customer verification, and speaker identification (or, alternatively, fraud detection). Customer verification involves confirming the identity of a customer by comparing the customer's biometrics, e.g., voiceprint, to previously enrolled voiceprints. In an example embodiment implementing text-independent verification, conversational audio of the speaker's voice can be used for verification, regardless of the content spoken. Speaker identification involves discovering the identity of the speaker by comparing the speaker's voice to a group of enrolled voiceprints, which can also be used for fraud detection by comparing the speaker's voice to a watchlist of fraudster voiceprints.

The signal stream forwarded from the web socket 1021 to the speech-to-text logic module 1023, which signal stream includes at least the conversational audio stream, is processed by the speech-to-text logic module 1023 with the assistance of an Automatic Speech Recognition (ASR) module 1041 (which can be, e.g., a machine learning model). The ASR module 1041 is used to generate a text transcription of the conversational audio stream, which text transcription is forwarded from the speech-to-text logic module 1023 to the intent/entity extraction module 1024. The intent/entity extraction module 1024 processes the text transcription with the assistance of a Natural Language Understanding module 1042 (which can be, e.g., a machine learning model). the NLU module 1042 is used to extract intents and/or entities from the text transcription. In the example embodiment shown, both the ASR module 1041 and the NLU module 1042 are part of an artificial-intelligence (AI)-based speech-handling platform, e.g., a conversational AI stack 104 such as Nuance™ Mix™.

Although not specifically shown in FIG. 1, the conversational AI stack 104 can include a Text-to-Speech (TTS) service which converts the output text (e.g., from module 1023) to audio, thereby enabling the ambient device 101 to work in multiple modalities (text, audio or both).

In this section, some examples of "intent" and "entity" are discussed.
- a. In a first example, given the statement "I want to pay my VISA™ bill":
  Intent="PAY BILL"; and
  Entity ("PAYEE=VISA™).
- b. In a second example, given the statement "I want to transfer $2000 from checking to savings account":
  Intent="BAL_TRANSFER": and
  Entity (From_Account=Checking, To_Account=Savings, Amount=$2000)

The intents and entities extracted by the intent/entity extraction module 1024 are forwarded to a business logic module 1025, which in turn produces an output that is forwarded to an automation platform 105 and/or the ambient device 101. Some examples of output that can be produced by the business logic module 1025 include the following:
1. Proactive provision of information (related actions performed before a user requests them):
   a. Product Information: Availability of a particular product and its details in context with the conversation.
   b. Recommendations: Current offers available in store related to product(s) of interest.
2. Reactive actions (actions performed after a related activity is completed):
   a. Adding customer to a mailing list based on the topics of interest pertinent to the customer.
   b. Logging information and/or details about a sale or customer for reporting and personalization.
3. Interactive implementation (Explicit Commands spoken by a user):
   a. Scheduling a delivery;
   b. Processing Payment; and/or
   c. Setting up a follow-up.

The output of the business logic module 1025 can be fed to the automation platform 105, which in turn can automate the desired actions/implementation. In an example embodiment, the automation platform 105 can be any Robotic Process Automation Platform, e.g., Microsoft™ Power Automate™, which is a cloud-based service platform to automate repetitive tasks (e.g., by connecting to various apps to create automated workflows). As shown in FIG. 1, output arrows from the automation platform 105 point to a customer relationship management (CRM) module 106, i.e., the automation platform 105 is the tool used to fill-in (and/or retrieve) the customer relationship information into (and/or from) the CRM module 106. In an example embodiment, the CRM 106 is Microsoft™ Dynamics™ CRM. The CRM module 106 can create, store, delete and/or update information about customers.

In an example, the automation platform 105 (e.g., a robot process automation platform) can utilize Hypertext Transfer Protocol (HTTP) action to invoke a REST application programming interface (API) for interacting with the CRM 106 to automate the sales agent's workflow. By using the HTTP action, the automation platform 105 can invoke/call an API by using methods GET (read), POST (write), PUT (update), PATCH (update, but only partially) or DELETE (remove) to send a request to the CRM 106. Some examples of actions that can be implemented to automate the sales agent's workflow include: create a new record (e.g., add in-store session records (transcription, summary, notes for customer account, etc.); update a record (e.g., update customer profile with new information); update a marketing list (add a customer to a marketing list that matches the customer's interests). These are merely examples of possible actions, and multitude of additional actions can be implemented.

According to an example embodiment of the present disclosure, the ambient listening system 10 can operate in at least 3 different modes: reactive, proactive and interactive, each of which will be discussed in detail below. In the reactive mode, there is no user participation, and the ambient listening system 10 simply listens to the audio and reacts accordingly, i.e., processes the audio and takes necessary actions. In the reactive mode, the ambient listening system 10 can perform, e.g., the following:
  a) Receive pre-recorded audio or perform live transcription. The application here can also work in offline mode and act upon pre-recorded audio (a transcription engine can be utilized for performing offline).
  b) Speech-to-text conversion (ASR), i.e., note taking.
  c) Summarize what is said.
  d) Perform certain reactive actions and recognize certain intents based on what is said.
  e) Distinguish between voices of customer and the sales agent (assuming the sales agent's voice print is already recorded), i.e., speech diarization.

Some specific examples of actions that can be implemented in the reactive mode include: scheduling a delivery; hearing an email address and adding the email address to a mailing list; logging preferences and interests of a customer; mapping products to the customer's preferences and interests; utilize robotic process automation (RPA) to automate actions.

In the proactive mode, the ambient listening system 10 enables provision of real-time insights to the sales agent for helping the customer, which insights can be a result of processing data (e.g., store data, user data, conversation transcript, etc.) in real time. In the reactive mode, the ambient listening system 10 can perform, e.g., the following:
  a) Listen to a live conversation and send the audio to a backend service.
  b) Recognize inquiries about a product by the product's name.
  c) Return information about price, availability, location in the store, options for pickup and/or delivery of the product inquired by the customer.
  d) Filter products based on conversation context.
  e) Hear an email address and add the email address to a mailing list.
  f) Answer certain technical questions about a product, e.g., product specification and comparison to other products.
  g) Identify the customer (e.g., either from the internal voiceprint records of the ambient listening system 10 or from an external source), and provide access to the CRM records for the customer.
  h) Provide pricing for a requested product in different stores, i.e., price check.

In the interactive mode, the ambient listening system 10 not only listens to a conversation and delivers output when it deems necessary, but the system can receive actual commands from a user (e.g., the sales agent) and take appropriate actions, i.e., the ambient listening system 10 can function as a voice assistant. Some of the commands that can be asked of the ambient listening system 10 (and answers provided by the system) in the interactive mode include, e.g., the following:

a) Ask the system about specifics of a certain product.
b) Ask the system to schedule deliveries.
c) Ask to update customer records.
d) Ask to proceed with payments.

As discussed above, voice biometric data can be used to enroll and identify repeat customers while keeping them anonymous; for verification of the customer if customer profile already exist; for personalization of shopping experience; and for fraud detection. In addition, customizable cards containing contextual information (e.g., conversation transcript summary), NLU (e.g., customer's intents and/or entities) and/or business logic can be shown on a user interface (e.g., of the ambient device 101) for ease of viewing information, rather than showing live transcripts in their entirety. Furthermore, "sales coach" functionalities can be implemented by the ambient listening system 10, e.g., i) providing filtered products in real-time based on inventory and contextual information gained from the conversation with the customer, and ii) providing real-time recommendations based on available store offers, customer profile, and/or contextual information. Additionally, the ambient listening system 10 is able to automate the sales agents' workflow, e.g., by: i) utilizing robotic process automation (RPA) for triggering and fulfillment of workflows; ii) creating new records; iii) updating existing records (e.g., updating customer profile with newly gained insights about the customer's shopping preferences); and iv) interlinking records (e.g., adding customers to a new marketing list). In these manners, the ambient listening system 10 according to the present disclosure enable the sales agents to be more efficient and effective in resolving customer queries in real-time, as well as freeing the sales agent to focus on customer interactions by automating manual processes.

FIG. 2 illustrates an example sequence of events in which the ambient device 101 (having a user interface screen 101*a* on which information is displayed) of the ambient listening system 10 according to the present disclosure is involved in listening to, and providing relevant information in response to, a conversation between a sales agent and a customer. Screenshot 2001*a* represents an initial query by the customer regarding a product. Screenshot 2001*b* represents the product profile (e.g., a wristwatch) and the customer's name (e.g., "Sarah Reed") being displayed on the screen of the ambient device 101. Screenshot 200*c* represents a price information in response to a price query. Screenshot 2001*d* represents relevant promotions and discounts being offered for the product queried by the customer. Screenshot 2001*e* represents product inventory and shipping schedule information. Screenshot 2001*f* represents payment method and customer delivery address confirmation.

The present disclosure provides a first example ambient listening system, which includes:

an ambient device configure to listen to a conversation between a customer and a sales agent regarding at least one of a desired service and a desired product, and generate an audio stream of the conversation and a unique identifier for the customer;

a voice biometrics service module configure to perform at least one of i) identification of the customer based on the audio stream, and ii) voiceprint enrollment of the customer's voice based on the audio stream and the unique identifier for the customer;

a business logic module configured to generate at least one business logic output based on at least one of customer's intent and entity extracted from the audio stream; and an automation platform configured to automate, based on the business logic output, the sales agent's workflow related to at least one of customer record, the desired service and the desired product.

The present disclosure provides a second example ambient listening system based on the above-discussed first example system, in which second example system:

the voice biometrics service module is additionally configured to perform speech diarization to distinguish between the customer's voice and the sales agent's voice; and at least one of i) the voice biometrics service module is configured to perform identification of the customer based on the customer's voiceprint if the customer's voiceprint already exists in the system, and ii) the voice biometrics service module is configured to perform voiceprint enrollment of the customer's voiceprint if the customer's voiceprint does not exist in the system.

The present disclosure provides a third example ambient listening system based on the above-discussed second example system, wherein the third example ambient listening system is configured to operate in at least one of:

a reactive mode, wherein no user participation occurs in the reactive mode;

a proactive mode, wherein the ambient listening system provides real-time insight to the sales agent; and an interactive mode, wherein a user is able to issue a task command to the ambient listening system, and the ambient listening system is able to implement the commanded task. which third example system is configured to operate in at least one of reactive mode, proactive mode and interactive mode.

The present disclosure provides a fourth example ambient listening system based on the above-discussed first example system, in which fourth example ambient listening system the voice biometrics service module is configured to perform at least one of:

customer verification involving confirming the identity of the customer by comparing the customer's voiceprint to previously enrolled voiceprints; and fraud detection by comparing the customer's voice to a watchlist of fraudster voiceprints.

The present disclosure provides a fifth example ambient listening system based on the above-discussed third example system, in which fifth example system the reactive mode operation includes at least one of:

scheduling a delivery;

hearing an email address and adding the email address to a mailing list;

logging preferences and interests of the customer;

mapping products to the customer's preferences and interests; and utilizing robotic process automation (RPA) to automate actions.

The present disclosure provides a sixth example ambient listening system based on the above-discussed third example system, in which sixth example system the proactive mode operation includes at least one of:

a) recognizing inquiries about a product by the product's name;

b) providing information about at least one of price, availability, location in the store, options for pickup, and options for delivery of the product inquired by the customer;
c) filtering products based on detected context of the conversation;
d) hearing an email address of the customer and adding the email address to a mailing list;
e) answering questions about at least one of product specification and comparison of a product to other products;
f) identifying the customer and providing access to customer's records; and
g) proving pricing for a requested product in at least one store.

The present disclosure provides a seventh example ambient listening system based on the above-discussed third example system, in which seventh example system the interactive mode operation includes at least one of:
a) providing specific details of a product by the ambient listening system in response to a query;
b) scheduling a delivery by the ambient listening system in response to a delivery request;
c) updating the customer's records by the ambient listening system in response to an update request; and
d) performing a payment transaction in response to a payment request.

The present disclosure provides an eighth example ambient listening system based on the above-discussed first example system, in which eighth example system the automation platform is configured to implement at least one of: i) creating new records relating to the customer; ii) updating existing records relating to the customer, including updating information relating to the customer's shopping preferences; and iii) interlinking records, including adding the customer to a marketing list.

The present disclosure provides a ninth example ambient listening system based on the above-discussed eighth example system, which ninth example system further includes:
a customer relationship management (CRM) module, wherein the automation platform interacts with the CRM module to implement the at least one of creating the new records relating to the customer, updating the existing records relating to the customer, and interlinking of records.

The present disclosure provides a tenth example ambient listening system based on the above-discussed first example system, in which tenth example system the ambient device has a user interface, and wherein a customized card for the customer is displayed on the user interface, the customized card containing at least one of i) contextual information derived from the conversation between the customer and the sales agent, ii) customer's intent and entity, and iii) business logic.

The present disclosure provides a first example method of operating an ambient listening system, which includes:
generating, by an ambient device configured to listen to a conversation between a customer and a sales agent regarding at least one of a desired service and a desired product, an audio stream of the conversation and a unique identifier for the customer;
performing, by a voice biometrics service module, at least one of i) identification of the customer based on the audio stream, and ii) voiceprint enrollment of the customer's voice based on the audio stream and the unique identifier for the customer;
generating, by a business logic module, at least one business logic output based on at least one of customer's intent and entity extracted from the audio stream; and
automating, using an automation platform, based on the business logic output, the sales agent's workflow related to at least one of customer record, the desired service and the desired product.

The present disclosure provides a second example method based on the above-discussed first example method, which second example method further includes:
performing, by the voice biometrics service module, speech diarization to distinguish between the customer's voice and the sales agent's voice; and
at least one of i) performing, by the voice biometrics service module, identification of the customer based on the customer's voiceprint if the customer's voiceprint already exists in the system, and ii) performing, by the voice biometrics service module, voiceprint enrollment of the customer's voiceprint if the customer's voiceprint does not exist in the system.

The present disclosure provides a third example method based on the above-discussed second example method, in which third example method the ambient listening system operates in at least one of:
a reactive mode, wherein no user participation occurs in the reactive mode;
a proactive mode, wherein the ambient listening system provides real-time insight to the sales agent; and
an interactive mode, wherein a user is able to issue a task command to the ambient listening system, and the ambient listening system is able to implement the commanded task.

The present disclosure provides a fourth example method based on the above-discussed first example method, in which fourth example method at least one of:
customer verification involving confirming the identity of the customer by comparing the customer's voiceprint to previously enrolled voiceprints is performed by the voice biometrics service module; and
fraud detection by comparing the customer's voice to a watchlist of fraudster voiceprints is performed by the voice biometrics service module.

The present disclosure provides a fifth example method based on the above-discussed third example method, in which fifth example method the reactive mode operation includes at least one of:
scheduling a delivery;
hearing an email address and adding the email address to a mailing list;
logging preferences and interests of the customer;
mapping products to the customer's preferences and interests; and
utilizing robotic process automation (RPA) to automate actions.

The present disclosure provides a sixth example method based on the above-discussed third example method, in which sixth example method the proactive mode operation includes at least one of:
a) recognizing inquiries about a product by the product's name;
b) providing information about at least one of price, availability, location in the store, options for pickup, and options for delivery of the product inquired by the customer;
c) filtering products based on detected context of the conversation;

d) hearing an email address of the customer and adding the email address to a mailing list;
e) answering questions about at least one of product specification and comparison of a product to other products;
f) identifying the customer and providing access to customer's records; and
g) proving pricing for a requested product in at least one store.

The present disclosure provides a seventh example method based on the above-discussed third example method, in which seventh example method the interactive mode operation includes at least one of:
a) providing specific details of a product by the ambient listening system in response to a query;
b) scheduling a delivery by the ambient listening system in response to a delivery request;
c) updating the customer's records by the ambient listening system in response to an update request; and
d) performing a payment transaction in response to a payment request.

The present disclosure provides an eighth example method based on the above-discussed first example method, in which eighth example method the automating using the automation platform includes at least one of: i) creating new records relating to the customer; ii) updating existing records relating to the customer, including updating information relating to the customer's shopping preferences; and iii) interlinking records, including adding the customer to a marketing list.

The present disclosure provides a ninth example method based on the above-discussed eighth example method, in which ninth example method a customer relationship management (CRM) module is additionally provided, and wherein the automation platform interacts with the CRM module to implement the at least one of creating the new records relating to the customer, updating the existing records relating to the customer, and interlinking of records.

The present disclosure provides a tenth example method based on the above-discussed first example method, in which tenth example method the ambient device has a user interface, and wherein a customized card for the customer is displayed on the user interface, the customized card containing at least one of i) contextual information derived from the conversation between the customer and the sales agent, ii) customer's intent and entity, and iii) business logic.

What is claimed is:
1. An ambient listening system, comprising:
an ambient device configure to listen to a conversation between a customer and a sales agent regarding at least one of a desired service and a desired product, and generate an audio stream of the conversation and a unique identifier for the customer;
a voice biometrics service module configure to perform at least one of i) identification of the customer based on the audio stream, and ii) voiceprint enrollment of the customer's voiceprint based on the audio stream and the unique identifier for the customer;
a business logic module configured to generate at least one business logic output based on at least one of customer's intent and entity extracted from the audio stream; and
an automation platform configured to automate, based on the business logic output, the sales agent's workflow related to at least one of customer record, the desired service and the desired product; and wherein the ambient listening system is configured to operate in:
a reactive mode, wherein no user participation occurs in the reactive mode;
a proactive mode, wherein the ambient listening system provides real-time insight to the sales agent; and
an interactive mode, wherein a user is able to issue a task command to the ambient listening system, and the ambient listening system is able to implement the commanded task.

2. The ambient listening system according to claim 1, wherein:
the voice biometrics service module is additionally configured to perform speech diarization to distinguish between the customer's voice and the sales agent's voice; and
at least one of i) the voice biometrics service module is configured to perform identification of the customer based on the customer's voiceprint if the customer's voiceprint already exists in the system, and ii) the voice biometrics service module is configured to perform voiceprint enrollment of the customer's voiceprint if the customer's voiceprint does not exist in the system.

3. The ambient listening system according to claim 1, wherein the voice biometrics service module is configured to perform at least one of:
customer verification involving confirming the identity of the customer by comparing the customer's voiceprint to previously enrolled voiceprints; and
fraud detection by comparing the customer's voice to a watchlist of fraudster voiceprints.

4. The ambient listening system according to claim 1, wherein the ambient listening system is configured to operate in a reactive mode, wherein no user participation occurs in the reactive mode, wherein the reactive mode operation includes at least one of:
scheduling a delivery;
hearing an email address and adding the email address to a mailing list;
logging preferences and interests of the customer;
mapping products to the customer's preferences and interests; and
utilizing robotic process automation (RPA) to automate actions.

5. The ambient listening system according to claim 1, wherein the ambient listening system is configured to operate in a proactive mode, wherein the ambient listening system provides real-time insight to the sales agent, wherein the proactive mode operation includes at least one of:
a) recognizing inquiries about a product by the product's name;
b) providing information about at least one of price, availability, location in a store, options for pickup, and options for delivery of the product inquired by the customer;
c) filtering products based on detected context of the conversation;
d) hearing an email address of the customer and adding the email address to a mailing list;
e) answering questions about at least one of product specification and comparison of a product to other products;
f) identifying the customer and providing access to customer's records; and
g) proving pricing for a requested product in at least one store.

6. The ambient listening system according to claim 1, wherein the ambient listening system is configured to operate in an interactive mode, wherein a user is able to issue a task command to the ambient listening system, and the ambient listening system is able to implement the commanded task, wherein the interactive mode operation includes at least one of:
   a) providing specific details of a product by the ambient listening system in response to a query;
   b) scheduling a delivery by the ambient listening system in response to a delivery request;
   c) updating the customer's records by the ambient listening system in response to an update request; and
   d) performing a payment transaction in response to a payment request.

7. The ambient listening system according to claim 1, wherein the automation platform is configured to implement at least one of: i) creating new records relating to the customer; ii) updating existing records relating to the customer, including updating information relating to the customer's shopping preferences); and iii) interlinking records, including adding the customer to a marketing list.

8. The ambient listening system according to claim 7, further comprising:
   a customer relationship management (CRM) module, wherein the automation platform interacts with the CRM module to implement the at least one of creating the new records relating to the customer, updating the existing records relating to the customer, and interlinking of records.

9. The ambient listening system according to claim 1, wherein the ambient device has a user interface, and wherein a customized card for the customer is displayed on the user interface, the customized card containing i) contextual information derived from the conversation between the customer and the sales agent, ii) customer's intent and entity, and iii) business logic.

10. A method of operating an ambient listening system, comprising:
   generating, by an ambient device configured to listen to a conversation between a customer and a sales agent regarding at least one of a desired service and a desired product, an audio stream of the conversation and a unique identifier for the customer;
   performing, by a voice biometrics service module, at least one of i) identification of the customer based on the audio stream, and ii) voiceprint enrollment of the customer's voice based on the audio stream and the unique identifier for the customer;
   generating, by a business logic module, at least one business logic output based on at least one of customer's intent and entity extracted from the audio stream; and
   automating, using an automation platform, based on the business logic output, the sales agent's workflow related to at least one of customer record, the desired service and the desired product;
   wherein the ambient listening system is configured to operate in the following modes:
      a reactive mode, wherein no user participation occurs in the reactive mode;
      a proactive mode, wherein the ambient listening system provides real-time insight to the sales agent; and
      an interactive mode, wherein a user is able to issue a task command to the ambient listening system, and the ambient listening system is able to implement the commanded task.

11. The method according to claim 10, further comprising:
   performing, by the voice biometrics service module, speech diarization to distinguish between the customer's voice and the sales agent's voice; and
   at least one of i) performing, by the voice biometrics service module, identification of the customer based on the customer's voiceprint if the customer's voiceprint already exists in the system, and ii) performing, by the voice biometrics service module, voiceprint enrollment of the customer's voiceprint if the customer's voiceprint does not exist in the system.

12. The method according to claim 10, wherein at least one of:
   customer verification involving confirming the identity of the customer by comparing the customer's voiceprint to previously enrolled voiceprints is performed by the voice biometrics service module; and
   fraud detection by comparing the customer's voice to a watchlist of fraudster voiceprints is performed by the voice biometrics service module.

13. The method according to claim 10, wherein the ambient listening system is configured to operate in a reactive mode, wherein no user participation occurs in the reactive mode, wherein the reactive mode operation includes at least one of:
   scheduling a delivery;
   hearing an email address and adding the email address to a mailing list;
   logging preferences and interests of the customer;
   mapping products to the customer's preferences and interests; and
   utilizing robotic process automation (RPA) to automate actions.

14. The method according to claim 10, wherein the ambient listening system is configured to operate in a proactive mode, wherein the ambient listening system provides real-time insight to the sales agent, wherein the proactive mode operation includes at least one of:
   a) recognizing inquiries about a product by the product's name;
   b) providing information about at least one of price, availability, location in the store, options for pickup, and options for delivery of the product inquired by the customer;
   c) filtering products based on detected context of the conversation;
   d) hearing an email address of the customer and adding the email address to a mailing list;
   e) answering questions about at least one of product specification and comparison of a product to other products;
   f) identifying the customer and providing access to customer's records; and
   g) proving pricing for a requested product in at least one store.

15. The method according to claim 10, wherein the ambient listening system is configured to operate in an interactive mode, wherein a user is able to issue a task command to the ambient listening system, and the ambient listening system is able to implement the commanded task, wherein the interactive mode operation includes at least one of:
   a) providing specific details of a product by the ambient listening system in response to a query;
   b) scheduling a delivery by the ambient listening system in response to a delivery request;

c) updating the customer's records by the ambient listening system in response to an update request; and
d) performing a payment transaction in response to a payment request.

16. The method according to claim 10, wherein the automating using the automation platform includes at least one of: i) creating new records relating to the customer; ii) updating existing records relating to the customer, including updating information relating to the customer's shopping preferences); and iii) interlinking records, including adding the customer to a marketing list.

17. The method according to claim 16, wherein a customer relationship management (CRM) module is additionally provided, and wherein the automation platform interacts with the CRM module to implement the at least one of creating the new records relating to the customer, updating the existing records relating to the customer, and interlinking of records.

18. The method according to claim 10, wherein the ambient device has a user interface, and wherein a customized card for the customer is displayed on the user interface, the customized card containing at least one of i) contextual information derived from the conversation between the customer and the sales agent, ii) customer's intent and entity, and iii) business logic.

* * * * *